Patented Sept. 16, 1952

2,610,924

UNITED STATES PATENT OFFICE 2,610,924

RESINOUS ADHESIVE COMPOSITION

Raymond R. Lamm, Philadelphia, Pa., assignor to The Patent and Licensing Corporation, New York, N. Y., a corporation of Massachusetts No Drawing. Application May 1, 1948, Serial No. 24,680

2 Claims. (Cl. 106—240)

This invention relates to a resinous composition, and more particularly to a resin-containing adhesive composition.

In the installation of wall and ceiling coverings such as acoustical tile, tile board and the like, adhesives are commonly employed for securing the coverings to the supporting surface. The method generally employed in acoustical tile installations, for example, involves applying daubs of the adhesive to the back of each tile, placing the tile against the ceiling to which it is to be bonded, and directing the tile into place by a sliding movement so as to spread the adhesive and unite the latter with the ceiling and the back of the tile.

Adhesives employed for this purpose must have high wet strength in order that the tiles will be held securely in place during the drying period while the solvent is evaporating from the adhesive composition. This requires an adhesive which exhibits a relatively high viscosity. To be practical, however, the adhesive must not be so viscous that it cannot readily be scooped out of the container with a trowel or knife and daubed on the back of the tile. Various types of adhesives have been proposed for use in securing acoustical tiles to ceilings, and are more or less satisfactory under certain temperature conditions. Such known adhesives, however, have the serious disadvantage of undergoing substantial changes in viscosity under the influence of temperature. These adhesives, for example, may have a satisfactory, workable consistency at about 70–85° F., but become so viscous at temperatures of 60° F. or below, that it is difficult to remove them from the containers and to daub them upon the tile, and at elevated temperatures of the order of about 100–115° F., they decrease in viscosity to such an extent that their wet strength is seriously impaired. For example, when tiles are applied with conventional adhesives at ceiling temperatures of 100–115° F., which are frequently encountered in summer weather, particularly in the warmer parts of the country, failure of the adhesive and consequent falling or sagging of the tiles may occur unless lightweight tile is used, which is undesirable in many cases. The working temperature range of known acoustical tile adhesives is, therefore, very limited, and the disadvantage of this is obvious. If the adhesive is too cold, as for example when it has been exposed to low temperatures during shipment and storage, considerable time is required to heat the adhesive to a workable consistency, and on the other hand, when ceiling temperatures are above about 100–115° F., installation of acoustical tiles with these adhesives cannot be made with assurance that numerous failures may not result.

It is an object of this invention to provide an adhesive adapted for use in installing acoustical tiles which has a satisfactory working consistency over a wide range of temperatures.

It is a further object of the invention to provide an adhesive which may be satisfactorily used at temperatures below 60° F., as well as at the highest summer temperatures ordinarily encountered, e. g., 115–120° F.

It is a still further object of the invention to provide an adhesive of the character indicated, the viscosity of which undergoes only relatively minor changes over the temperature range normally encountered.

According to the invention, an adhesive composition is provided which comprises a brittle resinous binder, a volatile solvent, and, as a plasticizer for the resinous binder, a hydrocarbon wax-naphthalene condensate. I have found that a hydrocarbon wax-naphthalene condensate, is an excellent plasticizer for brittle resinous materials, thereby rendering them plastic, and further, that the hydrocarbon wax-naphthalene condensate functions as a viscosity stabilizer for adhesives and like compositions which comprise a thus plasticized resinous material and a solvent. I have found, for example, that when a composition is made from a brittle resinous binder, a volatile solvent, a filler such as clay and a hydrocarbon wax-naphthalene condensate, there is obtained a highly effective acoustical tile adhesive, the viscosity of which undergoes little change between temperatures of 60° F. and 115° F. and, indeed, the adhesive is of workable consistency at temperatures as low as 35° F. This composition may, therefore, be applied at relatively low temperatures without the necessity of preparatory heating and retains its wet strength at the highest temperatures which are normally encountered in service. In my composition, the paraffin wax-naphthalene condensate functions both as a plasticizer and as a viscosity stabilizing agent. Thus it is not necessary to use other plasticizing agents, although they may be employed in limited quantities to obtain variations in the characteristics of the product.

The hydrocarbon wax-naphthalene condensate which I employ in the adhesive compositions of my invention is the product obtained by the condensation of chlorinated paraffin wax and naphthalene in the presence of catalysts of the Friedel-Crafts type, e. g., aluminum chloride. The condensation is generally effected in the presence of solvent such as kerosene. After the reaction has taken place, the catalytic sludge is withdrawn, the solvent and unreacted constituents removed by distillation and the hydrocarbon wax-naphthalene condensate recovered as the residual product. The paraffin wax-naphthalene condensate, a commercial form of which is sold under the trade name "Paraflow" is a viscous liquid with a flash point above 450° F. and a specific gravity at 60° F. of about 0.9. Other plasticizers may be used in addition to the paraffin wax-naphthalene condensate, such as, for example, pine oil, mineral oil derivatives and the like. When such supplementary plasticizers are used, I prefer to have the hydrocarbon wax-naphthalene condensate as the preponderant constituent of the plasticizer mixture in order to derive its function as the viscosity stabilizer of the finished composition.

The brittle resinous materials employed in my improved adhesive are preferably natural resins or resinous derivatives thereof such as rosin, dammar, kauri, batu, limed rosin, heat-treated rosin, natural resin esters, e. g., ester gum, and the like. I have found heat-treated rosin, limed rosin or mixtures thereof particularly effective as the resinous component of my adhesives.

The solvent may be any relatively volatile organic solvent of the hydrocarbon type such as petroleum naphtha, aromatic solvents and the like. I have found particularly effective, for example, a petroleum hydrocarbon fraction having a boiling range of about 300° to 375° F. Mixtures of hydrocarbon solvents and small amounts of other solvents such as alcohol may also be employed, as for example, when gum rosin, soda treated rosin, copal, and the like, are contained in the resin component.

A filler is generally added to impart desirable characteristics to the adhesive. Clay has been found particularly effective for this purpose although other fillers such as asbestos, whiting and slate flour may be employed. When clay is used as the filler, small amounts of water may be added for the purpose of increasing the effectiveness of the clay.

The proportions of the various components of the adhesives of the invention may be varied over a substantial range and satisfactory results obtained. For example, the amount of paraffin wax-naphthalene condensate used may be from about 5 to 100 parts per 100 parts of the brittle resinous component. Preferably I use about one part of the paraffin wax-naphthalene condensate to 3 parts of the resinous material. The proportion of resinous material will, of course, vary but for best results in an acoustical tile cement, it should represent about 25 to 40% of the total composition, preferably about one-third. The filler may vary from about one part to two parts per part of resin.

In preparing tile adhesives embodying the invention, the ingredients may be mixed at room temperatures or at higher temperatures, i. e., temperatures above the melting point of the resin. For example, the resinous material in pulverized form may be incorporated with the solvent and paraffin wax-naphthalene condensate or the resinous material may be added in molten form.

The following specific examples of acoustical tile adhesive formulations will serve to illustrate compositions containing a paraffin wax-naphthalene condensate. In these examples, proportions of the ingredients are expressed in parts by weight.

Measurements of viscosity of the adhesive compositions described below were made with a Mac-Michael viscosimeter using a No. 18 wire, a large inner cup and a 1 cm. plunger at the fourth level. The readings were taken after one minute.

EXAMPLE I

| | Parts |
|---|---|
| Limed rosin | 26 |
| Paraffin wax-naphthalene condensate | 8 |
| Clay | 50 |
| Petroleum naphtha | 11.5 |
| Water | 2 |

The limed rosin was added in pulverized form and the mixture blended until a homogeneous product was obtained.

EXAMPLE II

| | Parts |
|---|---|
| Limed rosin | 26 |
| Hydrocarbon wax-naphthalene condensate | 24 |
| Clay | 50 |
| Petroleum naphtha | 10 |
| Water | 2 |

This composition illustrates the use of a relatively large quantity of hydrocarbon wax-naphthalene condensate. Sufficient petroleum naphtha was added to adjust the viscosity to approximately 80 at 60° F. as measured by the Mac-Michael viscosimeter. This required about ten parts of naphtha in the above formulation.

The viscosities of the compositions described in Examples I and II were measured at 60° F., 80° F., and 115° F. As a standard for comparison, viscosity measurements at these three temperatures were also made on a sample of a typical high-grade acoustical tile cement, similar in composition to the cements of Examples I and II but containing pine oil as the plasticizer for the resinous component. The results of these measurements are tabulated in the table.

*Table*

| Material Tested | MacMichael viscosity | | |
|---|---|---|---|
| | At 60° F. | At 80° F. | At 115° F. |
| Composition of Example I | 80 | 76 | 74 |
| Composition of Example II | 81 | 75 | 74 |
| High Grade Acoustical Cement | Above 120 | 80 | 35 |

The compositions of Examples I and II were equal in wet strength, adhesivity and other desired qualities to the high grade acoustical cement used in the comparative tests. From Table I, it will be seen that when a paraffin wax-naphthalene condensate is used as the plasticizer for the resin component, an adhesive composition may be obtained which exhibits only a slight change in viscosity at temperatures of from 60° F. to 115° F., which is the temperature range normally encountered in the installation of acoustical tile, tile board and the like.

EXAMPLE III

This example illustrates the use of a mixture of heat-treated rosin and limed rosin:

| | Parts |
|---|---|
| Heat treated rosin | 29 |
| Limed rosin | 9 |
| Paraffin wax-naphthalene condensate | 4 |
| Clay | 48 |
| Petroleum naphtha | 11 |
| Water | 1½ |

This composition exhibited a stable viscosity over a wide temperature range, having a workable viscosity at 60° F. and at 115° F. not materially different from that at room temperature.

It will be apparent that various changes and modifications may be made without departing from the invention as defined in the appended claims, and it is, therefore, intended that the foregoing description shall be interpreted in an illustrative and not in a limiting sense.

I claim:

1. An adhesive composition consisting essentially of a brittle resinous binder comprising limed rosin, a plasticizer for said binder, a filler, and a volatile solvent for said binder, said plasticizer being the condensation product formed by condensing chlorinated paraffin wax with naphthalene and being present in the proportion of 5 to 100 parts per 100 parts of said binder, said composition being characterized by a substantially constant viscosity in the temperature range of from about 60° F. to about 115° F.

2. An adhesive composition consisting essentially of a brittle resinous binder comprising a mixture of limed rosin and heat-treated rosin, a plasticizer for said binder, a filler, and a volatile solvent for said binder, said plasticizer being the condensation product formed by condensing chlorinated paraffin with naphthalene and being present in the proportion of 5 to 100 parts per 100 parts of said binder, said composition being characterized by a substantially constant viscosity in the temperature range of from about 60° F. to about 115° F.

RAYMOND R. LAMM.

REFERENCES CITED

The following references are of record in the file of this patent:

UNITED STATES PATENTS

| Number | Name | Date |
|---|---|---|
| 371,681 | Grant | Oct. 18, 1887 |
| 1,919,454 | Ware | July 25, 1933 |
| 2,430,987 | Lindner et al. | Nov. 18, 1947 |
| 2,479,516 | Rust et al. | Aug. 16, 1949 |
| 2,534,447 | Hulse | Dec. 19, 1950 |